United States Patent
Vega (10) Patent No.: US 10,386,795 B2
(45) Date of Patent: Aug. 20, 2019

(54) METHODS AND APPARATUS FOR PARAMETER BASED LEARNING AND ADJUSTING TEMPERATURE PREFERENCES

(71) Applicant: Vivint, Inc., Provo, UT (US)

(72) Inventor: JonPaul Vega, Highland, UT (US)

(73) Assignee: Vivint, Inc., Provo, UT (US)

( * ) Notice: Subject to any disclaimer, the term of this patent is extended or adjusted under 35 U.S.C. 154(b) by 1140 days.

(21) Appl. No.: 14/528,775

(22) Filed: Oct. 30, 2014

(65) Prior Publication Data

US 2016/0123617 A1    May 5, 2016

(51) Int. Cl.
*F24F 11/30* (2018.01)
*F24F 11/62* (2018.01)
(Continued)

(52) U.S. Cl.
CPC .......... *G05B 13/0265* (2013.01); *F24F 11/30* (2018.01); *F24F 11/62* (2018.01); *G06N 20/00* (2019.01); *F24F 11/52* (2018.01); *F24F 11/56* (2018.01); *F24F 11/58* (2018.01); *F24F 11/64* (2018.01); *F24F 11/65* (2018.01); *F24F 2110/10* (2018.01); *F24F 2110/12* (2018.01); *F24F 2110/20* (2018.01); *F24F 2110/22* (2018.01); *F24F 2120/10* (2018.01);
(Continued)

(58) Field of Classification Search
None
See application file for complete search history.

(56) References Cited

U.S. PATENT DOCUMENTS 5,457,796 A * 10/1995 Thompson ............ G06F 3/0601
6,145,751 A * 11/2000 Ahmed .................. F24F 11/006
165/208

(Continued)

OTHER PUBLICATIONS

Chun, C. et al. (2008). Thermal diary: Connecting temperature history to indoor comfort. Building and Environment, 43(5), 877-885. DOI:10.1016/j.buildenv.2007.01.031.*

(Continued)

*Primary Examiner* — Kamran Afshar
*Assistant Examiner* — Benjamin J Buss
(74) *Attorney, Agent, or Firm* — Holland & Hart LLP (57) ABSTRACT

A method for relative temperature preference learning is described. In one embodiment, the method includes identifying one or more current settings of a thermostat located at a premises, identifying one or more current indoor and outdoor conditions, calculating a current indoor differential between the current indoor temperature and the current target temperature, calculating a current outdoor differential between the current outdoor temperature and the current target temperature, and learning temperature preferences based on an analysis of the one or more current indoor conditions and the one or more current outdoor conditions. The one or more current settings of the thermostat include at least one of a current target temperature, current runtime settings, and current airflow settings. The one or more current indoor and outdoor conditions include at least one of a current temperature, current humidity, current indoor airflow, current atmospheric pressure, current level of precipitation, and current cloud cover.

12 Claims, 6 Drawing Sheets

(51) Int. Cl.
  *G05B 13/02* (2006.01)
  *G06N 20/00* (2019.01)
  *F24F 11/52* (2018.01)
  *F24F 11/56* (2018.01)
  *F24F 11/58* (2018.01)
  *F24F 11/64* (2018.01)
  *F24F 11/65* (2018.01)
  *F24F 110/10* (2018.01)
  *F24F 110/12* (2018.01)
  *F24F 110/20* (2018.01)
  *F24F 110/22* (2018.01)
  *F24F 120/10* (2018.01)
  *F24F 120/12* (2018.01)
  *F24F 120/20* (2018.01)
  *F24F 130/00* (2018.01)
  *F24F 130/10* (2018.01)

(52) U.S. Cl.
  CPC ....... *F24F 2120/12* (2018.01); *F24F 2120/20* (2018.01); *F24F 2130/00* (2018.01); *F24F 2130/10* (2018.01); *G05B 2219/2614* (2013.01)

(56) References Cited

U.S. PATENT DOCUMENTS

| | | | |
|---|---|---|---|
| 8,788,448 B2 | 7/2014 | Fadell et al. | |
| 8,791,417 B2* | 7/2014 | Scelzi | G01K 17/20 250/338.1 |
| 9,696,055 B1* | 7/2017 | Goodman | G05D 23/1932 |
| 2004/0083029 A1* | 4/2004 | Bicknell | G05D 23/1931 700/276 |
| 2004/0117330 A1* | 6/2004 | Ehlers | G06Q 10/10 705/412 |
| 2008/0121729 A1* | 5/2008 | Gray | G05D 23/1934 236/51 |
| 2009/0001181 A1* | 1/2009 | Siddaramanna | F23N 5/203 236/46 R |
| 2010/0025483 A1* | 2/2010 | Hoeynck | F24F 11/001 236/1 C |
| 2010/0318227 A1* | 12/2010 | Steinberg | F24F 11/006 700/278 |
| 2011/0191257 A1* | 8/2011 | Bernard | G06Q 50/01 705/319 |
| 2012/0123594 A1* | 5/2012 | Finch | G05B 15/02 700/278 |
| 2012/0215369 A1* | 8/2012 | Desai | G06Q 10/06 700/291 |
| 2012/0245740 A1* | 9/2012 | Raestik | F24F 11/006 700/276 |
| 2012/0296482 A1* | 11/2012 | Steven | G06Q 50/06 700/291 |
| 2013/0099011 A1* | 4/2013 | Matsuoka | G05D 23/1904 236/1 C |
| 2013/0140016 A1* | 6/2013 | Storm | F24F 11/006 165/205 |
| 2013/0321637 A1* | 12/2013 | Frank | H04N 5/33 348/152 |
| 2015/0148967 A1* | 5/2015 | Logan | G05B 15/02 700/276 |
| 2015/0300862 A1* | 10/2015 | O'Halloran | G02B 27/0006 73/199 |
| 2015/0300892 A1* | 10/2015 | Malhotra | G01K 13/00 700/276 |
| 2016/0018119 A1* | 1/2016 | Desmet | F04D 25/088 165/237 |
| 2016/0018123 A1* | 1/2016 | Yabunouchi | F24F 11/30 700/278 |

OTHER PUBLICATIONS

Koehler, C. et al. (Sep. 2013). TherML: occupancy prediction for thermostat control. In Proceedings of the 2013 ACM international joint conference on Pervasive and ubiquitous computing (pp. 103-112). ACM. DOI:10.1145/2493432.2493441.*

Dounis et al., Advanced control systems engineering for energy and comfort management in a building environment—A review, Renewable and Sustainable Energy Reviews 13, pp. 1246-1261, 2009.

* cited by examiner

Historical Temperature Data — 305

| Target Temp | Indoor Conditions | Outdoor Conditions | Indoor Differential | Outdoor Differential |
|---|---|---|---|---|
| 72 F | Temp: 74 F<br>Humidity: 30% | Temp: 80 F<br>Humidity: 35% | +2 F | +8 F |
| 70 F | Temp: 68 F<br>Humidity: 35% | Temp: 70 F<br>Humidity: 45% | -2 F | 0 F |
| 68 F | Temp: 68 F<br>Humidity: 40% | Temp: 60 F<br>Humidity: 55% | 0 F | -8 F |
| 68 F | Temp: 66 F<br>Humidity: 45% | Temp: 50 F<br>Humidity: 65% | -2 F | -18 F |
| ... | ... | ... | ... | ... |
| 72 F | Temp: 74 F<br>Humidity: 25% | Temp: 90 F<br>Humidity: 30% | +2 F | +18 F |

METHODS AND APPARATUS FOR PARAMETER BASED LEARNING AND ADJUSTING TEMPERATURE PREFERENCES

BACKGROUND

Advancements in media delivery systems and data-related technologies continue to increase at a rapid pace. Increasing demand for accessible data has influenced the advances made to data-related technologies. Computer systems have increasingly become an integral part of data creation, data usage, and data storage. Computer systems may be used to carry out several data-related functions. The widespread access to data has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the widespread use of computers and mobile devices has come an increased presence of and continued advancements in building and residential automation, and building and residential indoor climate control systems. For example, advancements in mobile devices allow users to monitor and/or adjust the indoor climate of a home or business from anywhere in the world. Nevertheless, benefits may be realized by providing systems and methods for improving automation and indoor climate control systems.

SUMMARY

According to at least one embodiment, a method for relative temperature preference learning is described. In one embodiment, the method may include identifying one or more current settings of a thermostat located at a premises, identifying one or more current indoor and outdoor conditions, calculating a current indoor differential between the current indoor temperature and the current target temperature, and calculating a current outdoor differential between the current outdoor temperature and the current target temperature. The one or more current settings of the thermostat may include at least one of a current target temperature, a current runtime settings, and a current airflow settings. The one or more current indoor conditions may include at least one of a current indoor temperature, a current indoor humidity, and a current indoor airflow. The one or more current outdoor conditions may include at least one of a current outdoor temperature, a current outdoor humidity, a current atmospheric pressure, a current level of precipitation, and a current level of cloud cover.

In some embodiments, the method may include communicating, over a period of time, suggested target temperatures to an occupant of the premises and tracking, over the time period, user acceptance of the suggested target temperatures. Upon determining the user acceptance of suggested target temperatures over the time period satisfies a user acceptance threshold, the method may include automatically adjusting the current target temperature without communicating the suggested target temperatures for user acceptance.

In some embodiments, the method may include storing historical temperature data. The historical temperature data may include multiple historical target temperatures. Each record of the plurality of historical target temperatures may be associated with an historical indoor temperature and historical outdoor temperature. In some cases, the method may include calculating an indoor differential between each historical target temperature and an associated historical indoor temperature and calculating an outdoor differential between each historical target temperature and an associated historical outdoor temperature.

In some embodiments, the method may include calculating an average indoor differential from the calculated indoor differentials and calculating an average outdoor differential from the calculated outdoor differentials. In some cases, the method may include determining whether the current indoor differential satisfies an indoor differential threshold. The indoor differential threshold may be based on the calculated average indoor differential. Upon determining the current indoor differential satisfies the indoor differential threshold and the premises is occupied, the method may include calculating a suggested target temperature based on the learned temperature preferences, the learned temperature preferences being based on the analysis of the one or more current indoor conditions and the one or more current outdoor conditions in relation to the stored historical temperature data.

In some embodiments, the method may include determining whether the current outdoor differential satisfies an outdoor differential threshold. The outdoor differential threshold may be based on the calculated average outdoor differential. Upon determining that the current outdoor differential satisfies the outdoor differential threshold and the premises is occupied, the method may include calculating a suggested target temperature based on the learned temperature preferences, the learned temperature preferences being based on the analysis of the one or more current indoor conditions and the one or more current outdoor conditions in relation to the stored historical temperature data.

A computing device configured for relative temperature preference learning is also described. The computing device may include a processor and memory in electronic communication with the processor. The memory may store computer executable instructions that when executed by the processor cause the processor to perform the steps of identifying one or more current settings of a thermostat located at a premises, identifying one or more current indoor and outdoor conditions, calculating a current indoor differential between the current indoor temperature and the current target temperature, and calculating a current outdoor differential between the current outdoor temperature and the current target temperature. The one or more current settings of the thermostat may include at least one of a current target temperature, current runtime settings, and current airflow settings. The one or more current indoor conditions may include at least one of a current indoor temperature, a current indoor humidity, and a current indoor airflow. The one or more current outdoor conditions may include at least one of a current outdoor temperature, a current outdoor humidity, a current atmospheric pressure, a current level of precipitation, and a current level of cloud cover.

A non-transitory computer-readable storage medium storing computer executable instructions is also described. When the instructions are executed by a processor, the execution of the instructions may cause the processor to perform the steps of identifying one or more current settings of a thermostat located at a premises, identifying one or more current indoor and outdoor conditions, calculating a current indoor differential between the current indoor temperature and the current target temperature, and calculating a current outdoor differential between the current outdoor temperature and the current target temperature. The one or more current settings of the thermostat may include at least one of a current target temperature, a current runtime settings, and a current airflow settings. The one or more current indoor conditions may include at least one of a current indoor temperature, a current indoor humidity, and a current indoor airflow. The one or more current outdoor conditions may include at least one of a current outdoor temperature, a current outdoor humidity, a current atmospheric pressure, a current level of precipitation, and a current level of cloud cover.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to building and residential automation and security systems. More specifically, the systems and methods described herein relate to relative temperature preference learning in relation to a building and residential automation system.

The following relates generally to improving climate control in a building environment. The typical heating ventilation air conditioning (HVAC) system is composed of a thermostat located in a central location. This thermostat controls the heating and cooling of an entire home. The desire to heat or cool the home is determined largely by aspects of the outdoor environment. Aspects such as outdoor temperature, outdoor humidity levels, precipitation, atmospheric pressure, wind, and cloud cover can determine the amount of heating or cooling a building requires to maintain a comfortable indoor environment. A typical building, however, simply sets a target temperature for a wide range of outdoor environmental aspects. For example, while a thermostat may be set to cool a building to maintain a certain temperature during the summer and parts of spring and fall, the indoor level of comfort may vary based on outdoor conditions. Likewise, the same thermostat may be set to heat a building to maintain a certain temperature during the winter and parts of spring and fall, while the indoor level of comfort varies due to outdoor conditions. Accordingly, the systems and methods described herein improve the typical HVAC system to address such concerns.

In one embodiment, the present systems and methods remedy the problems of current HVAC systems by incorporating temperature comfort logic, real-time temperature management, and in the case of homes, learning occupant comfort levels to improve the efficient use of the HVAC system in the home. Thus, one aspect of the invention relates to systems, methods and related devices for improving the efficiency of heating ventilation and air conditioning (HVAC) systems via monitoring an outdoor environment while monitoring and controlling one or more aspects of an indoor environment. Present HVAC systems are typically controlled by a centrally located thermostat. The centrally located thermostat usually controls a single HVAC heating and cooling unit. A user may set the thermostat to turn on cooling when the thermostat registers a high temperature threshold, and set the thermostat to turn on heating when the thermostat registers a low temperature threshold. The user may simply "set and forget" the target indoor temperature, humidity, and/or airflow (e.g., fan speed, dampers, etc.). For example, during the cooler months a user may set the thermostat to trigger the furnace turning on when the thermostat registers 68° Fahrenheit (F) or less. Likewise, during the warmer months a user may set the thermostat to trigger the air conditioning unit when the thermostat registers 72° F. or more. The problem with using a "set and forget" temperature to control a climate of an entire building lies in the fact that the average zone of comfort within a premises is affected by more than just temperature. A comfort zone within the premises may be controlled by such factors as humidity measurements, temperature measurements, air movement, etc. For example, the comfort zone may be determined by relative humidity, absolute humidity, specific humidity, humidity ratio, wet-bulb temperature, dry-bulb temperature, dew point temperature, operative temperature, mean radiant temperature, vapor pressure, specific enthalpy, specific volume, air movement, the season of the year, the type of clothing worn by an occupant, and the activity level of an occupant. Accordingly, the present systems and methods may be configured to monitor one or more indoor and outdoor factors of an environment of a premises in order to calculate, in real-time, a comfort zone based on current conditions.

In some embodiments, the present system may detect when a thermostat is set and/or adjusted. The thermostat may be set and/or adjusted manually at a thermostat, remotely via a mobile application executing on a smartphone, etc., and/or by a thermostat program schedule. Upon detecting the target indoor temperature being set, the system may detect one or more aspects within the building and/or outside the building. For example, the system may detect the current indoor temperature, an indoor humidity level, an outdoor temperature, an outdoor humidity level, precipitation, a level of precipitation, a type of precipitation, an atmospheric pressure, wind, a level of wind, and the like. The system may correlate the present indoor and outdoor conditions with the set target indoor temperature. Correlations between the setting of target indoor temperatures and the indoor/outdoor conditions at the time the target indoor temperatures are set may be stored in a storage device such as a database. For example, when a user sets the indoor temperature to 72° F., the system may record that the current indoor temperature is 74° F., the indoor humidity is 25%, the indoor air flow is negligible, the outside temperature is 85° F., the outside humidity is 30%, the precipitation level is zero, the atmospheric pressure is 1 atmosphere (atm) (i.e., 14.696 psi or 29.925 inches of mercury), that the atmospheric pressure is rising, and that the wind level is 5 miles per hour or less, etc. The system may store a correlation between these indoor/outdoor conditions and the setting of the target indoor temperature to 72° F. In some cases, the system may randomly query an occupant regarding his or her comfort level. The system may correlate a response from the occupant in relation to current indoor/outdoor conditions and a current thermostat setting.

In one embodiment, the system may suggest a target indoor temperature based on the stored correlations. In some cases, the system may analyze stored correlations and suggest a target indoor temperature based on this analysis. In some cases, the system may analyze real-time energy costs. The system may include a projected energy cost associated with a suggested target indoor temperature. For example, the system may determine the current cost of one kilowatt of electricity, determine the amount of electricity to cool a building to the suggested target indoor temperature and provide this cost analysis when displaying a suggested target indoor temperature. The system may track the responses of the occupant and further refine a suggested target indoor temperature based on occupant responses.

In some cases, the system may monitor when a user modifies a suggested indoor temperature. For example, the system may suggest a target indoor temperature of 72° F. and detect the user adjusting the target indoor temperature to 71° F. The system may correlate current indoor/outdoor conditions to the user-adjusted target indoor temperature. In some cases, the system may learn user preference regarding target indoor temperature. For example, the system may track a user's approval of a suggested target indoor temperature relative to a predetermined approval threshold. In some cases, upon detecting the user approving the suggested target indoor temperature a preset number of times, the system may automatically adjust the target temperature without communicating the suggested target temperature to a computing device for user approval. Additionally, or alternatively, upon detecting the user approving the suggested target indoor temperature at least some percentage of the time (e.g., 90% of the time), the system may automatically adjust the target temperature without communicating the suggested target temperature to a computing device for user approval. In some cases, upon detecting the user modifying the suggested target indoor temperature within a predefined range (e.g., the occupant modifies the suggested target indoor temperature within plus or minus 1° F. for some majority of suggested target temperatures), the system may automatically adjust the target temperature without communicating the suggested target temperature to a computing device for user approval. In some cases, the system may determine a comfort range and suggest a target indoor temperature within the range. Accordingly, the present systems and methods may learn an occupant's ideal comfort level and control one or more aspects of an HVAC system to align the interior climate of the premises with the occupant's ideal comfort level.

Figure 1:
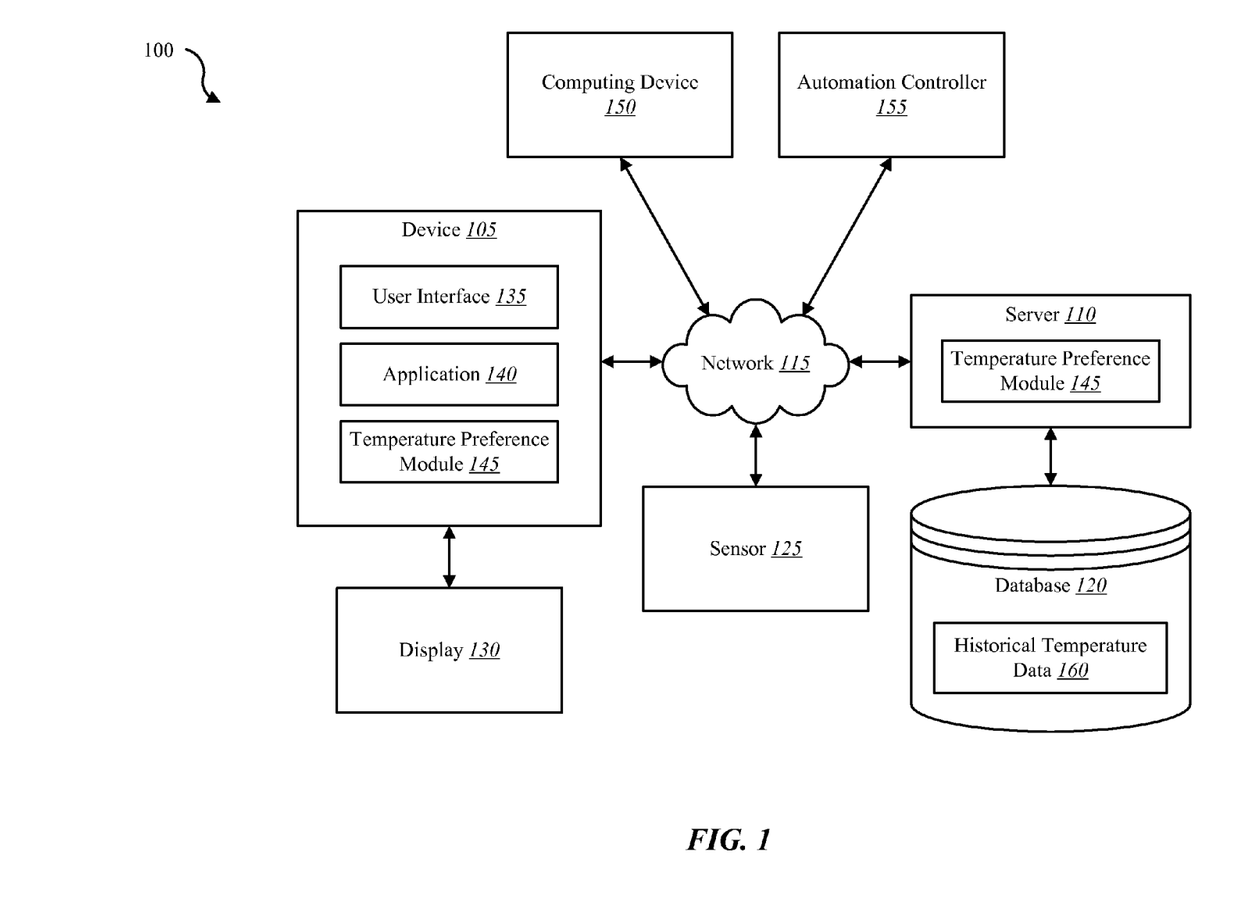
FIG. 1 is a block diagram illustrating one embodiment of an environment in which the present systems and methods may be implemented.

FIG. 1 is a block diagram illustrating one embodiment of an environment 100 in which the present systems and methods may be implemented. In some embodiments, the systems and methods described herein may be performed on a device (e.g., device 105). As depicted, the environment 100 may include a device 105, a server 110, a sensor 125, a display 130, a computing device 150, an automation controller 155, and a network 115 that allows the device 105, the server 110, the computing device 150, automation controller 155, and sensor 125 to communicate with one another.

Examples of the device 105 may include any combination of mobile devices, smart phones, personal computing devices, computers, laptops, desktops, servers, media content set top boxes, satellite set top boxes, cable set top boxes, DVRs, personal video recorders (PVRs), etc. In some cases, device 105 may include a building automation controller integrated within device 105, or as depicted, may be in communication with an automation controller via network 115. Examples of the automation controller 155 may include any device configured to control a building such as a home, a business, a government facility, etc. Accordingly, examples of automation controller 155 include any combination of a dedicated building automation computing device (e.g., wall-mounted controller), a personal computing device (e.g., laptop, desktop, etc.), a mobile computing device (e.g., tablet computing device, smartphone, etc.), and the like. Examples of computing device 150 may include any combination of a mobile computing device, a laptop, a desktop, a server, a media set top box, etc. Examples of server 110 may include any combination of a data server, a cloud server, a server associated with an automation service provider, proxy server, mail server, web server, application server, database server, communications server, file server, home server, mobile server, name server, etc.

Examples of sensor 125 may include any combination of a camera sensor, audio sensor, forced entry sensor, shock sensor, proximity sensor, boundary sensor, light beam sensor, three-dimensional (3-D) sensor, motion sensor, smoke sensor, glass break sensor, door sensor, window sensor, carbon monoxide sensor, accelerometer, global positioning system (GPS) sensor, Wi-Fi positioning system sensor, capacitance sensor, radio frequency sensor, near-field sensor, temperature sensor, humidity sensor, airflow sensor, atmospheric pressure sensor, precipitation sensor, cloud cover sensor, heartbeat sensor, breathing sensor, oxygen sensor, carbon dioxide sensor, brain wave sensor, movement sensor, voice sensor, other types of sensors, actuators, or combinations thereof. Sensor 125 may represent one or more separate sensors or a combination of two or more sensors in a single device. For example, sensor 125 may represent one or more camera sensors and one or more motion sensors connected to environment 100. Sensor 125 may be integrated with an identity detection system such as a facial recognition system and/or a voice recognition system. Although sensor 125 is depicted as connecting to device 105 over network 115, in some embodiments, sensor 125 may connect directly to or within device 105.

Additionally, or alternatively, sensor 125 may be integrated with a home appliance or fixture such as a light bulb fixture. Sensor 125 may include an accelerometer to enable sensor 125 to detect a movement. For example, sensor 125 may be carried by an occupant. Sensor 125 may include a wireless communication sensor 125 configured to send and receive data and/or information to and from one or more devices in environment 100. Additionally, or alternatively, sensor 125 may include a GPS sensor to enable sensor 125 to track a location of sensor 125 attached to an occupant and/or object. Sensor 125 may include a proximity sensor to enable sensor to detect a proximity of a person relative to an object to which the sensor is attached and/or associated. In some embodiments, sensor 125 may include a forced entry sensor (e.g., shock sensor, glass break sensor, etc.) to enable sensor 125 to detect an attempt to enter an area by force. Sensor 125 may include a siren to emit one or more frequencies of sound (e.g., an alarm).

In some configurations, the device 105 may include a user interface 135, an application 140, and a temperature preference module 145. Although the components of the device 105 are depicted as being internal to the device 105, it is understood that one or more of the components may be external to the device 105 and connect to device 105 through wired and/or wireless connections. In some embodiments, application 140 may be installed on computing device 150 in order to allow a user to interface with a function of device 105, temperature preference module 145, automation controller 155, and/or server 110.

In some embodiments, device 105 may communicate with server 110 via network 115. Examples of network 115 may include any combination of cloud networks, local area networks (LAN), wide area networks (WAN), virtual private networks (VPN), wireless networks (using 802.11, for example), cellular networks (using 3G and/or LTE, for example), etc. In some configurations, the network 115 may include the Internet. It is noted that in some embodiments, the device 105 may not include a temperature preference module 145. For example, device 105 may include application 140 that allows device 105 to interface with automation controller 155 via temperature preference module 145 located on another device such as computing device 150 and/or server 110. In some embodiments, device 105, automation controller 155, and server 110 may include a temperature preference module 145 where at least a portion of the functions of temperature preference module 145 are performed separately and/or concurrently on device 105, automation controller 155, and/or server 110. Likewise, in some embodiments, a user may access the functions of device 105 and/or automation controller 155 (directly or through device 105 via temperature preference module 145) from computing device 150. For example, in some embodiments, computing device 150 includes a mobile application that interfaces with one or more functions of device 105, automation controller 155, temperature preference module 145, and/or server 110.

In some embodiments, server 110 may be coupled to database 120. Database 120 may be internal or external to the server 110. In one example, device 105 may be coupled directly to database 120, database 120 being internal or external to device 105. Database 120 may include historical temperature data 160. For example, device 105 may access historical temperature data 160 in database 120 over network 115 via server 110. Historical temperature data 160 may include thermostat settings and associated indoor/outdoor conditions over a particular period of time. For example, historical temperature data 160 may include historical target temperatures, historical indoor/outdoor temperatures, historical indoor/outdoor humidity, etc. In some cases, each record of historical target temperatures may be associated with an historical indoor temperature and historical outdoor temperature.

Temperature preference module 145 may enable temperature preference learning, learning the temperature preferences of occupants in a premises. In some embodiments, temperature preference module 145 may be configured to perform the systems and methods described herein in conjunction with user interface 135 and application 140. Further details regarding the temperature preference module 145 are discussed below.

Figure 2:
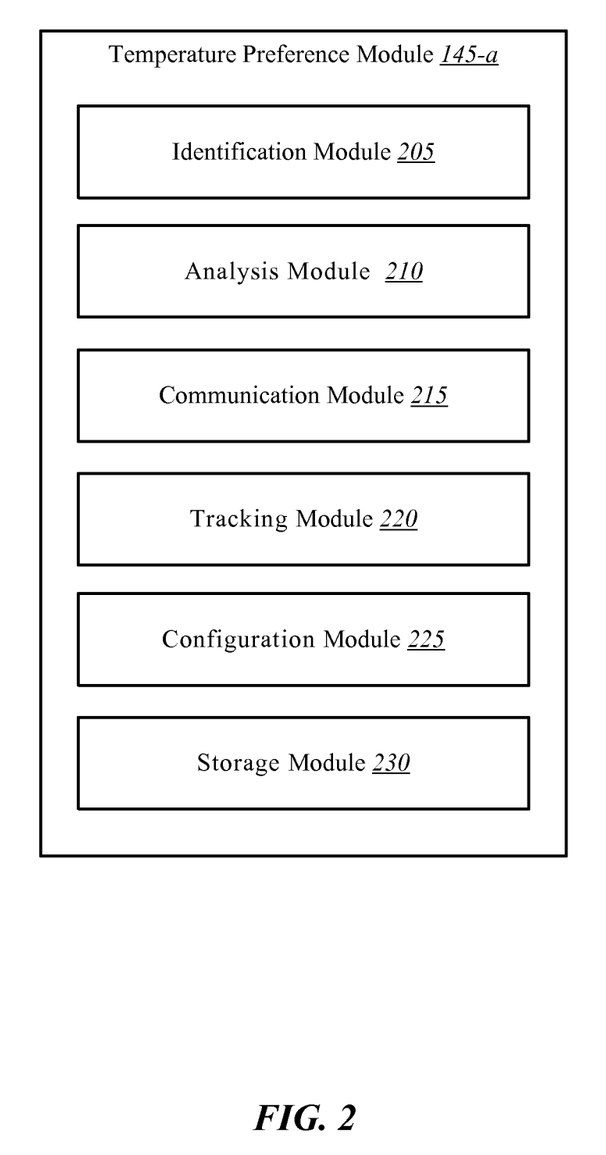
FIG. 2 is a block diagram illustrating one example of an relative temperature module.

FIG. 2 is a block diagram illustrating one example of a temperature preference module 145-*a*. Temperature preference module 145-*a* may be one example of the temperature preference module 145 depicted in FIG. 1. As depicted, temperature preference module 145-*a* may include identification module 205, analysis module 210, communication module 215, tracking module 220, configuration module 225, storage module 230.

In one embodiment, identification module 205 may identify one or more current settings of a thermostat located at a premises. The one or more current settings of the thermostat may include at least one of a current target temperature, current runtime settings, and/or current airflow settings. Current airflow settings may be determined based on airflow sensors, damper settings, and/or whether an HVAC fan is on or not, and if on, a speed setting at which the fan is operating. In some embodiments, identification module 205 may identify one or more current indoor conditions. The one or more current indoor conditions may include at least one of a current indoor temperature, current indoor humidity, and current indoor airflow. In some cases, identification module 205 may identify one or more current outdoor conditions. The one or more current outdoor conditions may include at least one of a current outdoor temperature, a current outdoor humidity, a current atmospheric pressure, a current level of precipitation, and/or a current level of cloud cover. In one embodiment, analysis module 210 may calculate a current indoor differential between the current indoor temperature and the current target temperature. In some cases, analysis module 210 may calculate a current outdoor differential between the current outdoor temperature and the current target temperature.

In one embodiment, communication module 215 may communicate, over a period of time, suggested target temperatures to an occupant of the premises. The suggested target temperatures may be based on the calculated indoor and/or outdoor temperature differentials. In some cases, tracking module 220 may track, over the time period, user acceptance of the suggested target temperatures. Upon determining the user acceptance of suggested target temperatures over the time period satisfies a user acceptance threshold, configuration module 225 may automatically adjust the current target temperature without communicating the suggested target temperatures for user acceptance (e.g., without seeking user input, without sending a notification, without asking the user for permission to accept the suggested temperature, etc.).

The user acceptance threshold may be based on accuracy between the suggested target temperature and learned occupant preferences. In some cases, the user acceptance may be based on an occupant accepting a predetermined number of suggested target temperatures, a rate of occupant acceptance (e.g., occupant accepts 90% or more of the suggested target temperatures for a set number of suggestions or for a set period of time, etc.), whether an adjustment to the suggested target temperature made by the occupant occurs within a predetermined range (e.g., 72° F. is suggested and the occupant adjusts this by no more than +/−one degree, etc.).

In some embodiments, storage module 230 may store historical temperature data. The historical temperature data may include a plurality of historical target temperatures. In some cases, each record of the plurality of historical target temperatures may be associated with a historical indoor temperature and/or historical outdoor temperature. Each time a target temperature is recorded, the current indoor and/or outdoor conditions may be detected and recorded with the target temperature. In some cases, storage module 230 may store several correlations between historical thermostat settings and historical indoor and outdoor conditions. Storage module 230 may store correlations between a thermostat settings with a current indoor temperature and humidity, a current outdoor temperature and humidity, a current indoor airflow, a current atmospheric pressure, a current level of cloud cover, and/or a current level of precipitation, etc. The storage module 230 may identify and store thermostat settings over time. Indoor and outdoor conditions associated with those thermostat settings may be stored with the thermostat settings.

In one embodiment, analysis module 210 may calculate an indoor differential between each historical target temperature and an associated historical indoor temperature. In some cases, analysis module 210 may calculate an outdoor differential between each historical target temperature and an associated historical outdoor temperature. In one embodiment, analysis module 210 may calculate an average indoor differential from the calculated indoor differentials. In some cases, analysis module 210 may calculate an average outdoor differential from the calculated outdoor differentials. Analysis module 210 may determine whether a current indoor differential satisfies an indoor differential threshold. The indoor differential threshold may be based on the calculated average indoor differential. In some cases, the analysis module 210 may determine whether the current indoor differential satisfies the indoor differential threshold for a predetermined time period such as 5 minutes. For example, if the calculated average indoor differential overall was 3° F., then the indoor differential threshold may be set to 3° F., and in some cases analysis module 210 may determine the threshold is satisfied if the current indoor differential exceeds the threshold for at least 5 minutes. Upon determining that the current indoor differential satisfies the indoor differential threshold and the premises is occupied, analysis module 210 may calculate a suggested target temperature based on learned temperature preferences, the learned temperature preferences being based on the analysis of the one or more current indoor conditions and the one or more current outdoor conditions in relation to the stored historical temperature data. In some cases, calculation of the suggested target temperature may be based on occupancy in a premises. Thus, upon detecting occupancy and upon satisfying the indoor differential threshold, analysis module 210 may calculate a suggested target temperature and communicate the suggested target temperature to a computing device for occupant acceptance. Occupancy may be detected by motion sensor, by identifier (e.g., key fob identifier, smartphone identifier, etc.), by location services (e.g., global and/or local positioning system), by detecting a security system being disarmed, etc.

In some cases, analysis module 210 may determine whether the current outdoor differential satisfies an outdoor differential threshold, the outdoor differential threshold being based on the calculated average outdoor differential. Upon determining the current outdoor differential satisfies the outdoor differential threshold, analysis module 210 may calculate a suggested target temperature based on learned temperature preferences, the learned temperature preferences being based on the analysis of the one or more current indoor conditions and the one or more current outdoor conditions in relation to the stored historical temperature data. In some cases, calculation of the suggested target temperature may be based on occupancy in a premises. Thus, upon detecting occupancy and upon satisfying the outdoor differential threshold, analysis module 210 may calculate a suggested target temperature and communicate the suggested target temperature to a computing device for occupant acceptance.

In one example, the identification module 205 may identify a thermostat setting of a target indoor temperature of 72° F. on a particular day. The identification module 205 may identify that the current indoor temperature is 74° F. and the current outdoor temperature is 80° F. Likewise, the identification module 205 may identify a thermostat setting of a thermostat setting of a target indoor temperature of 72° F. and a current indoor humidity of 30% and current outdoor humidity of 35%. Thus, thermostat settings during each season may be correlated with the indoor/outdoor conditions identified at the time each thermostat setting is identified. Thus, the analysis module 210 may calculate an average differential between a target indoor temperature. For example, the analysis module 210 may calculate an average differential between target indoor temperatures and their associated indoor temperatures. Likewise, the analysis module 210 may calculate an average differential between target outdoor temperatures and their associated outdoor temperatures. Indoor and outdoor differential thresholds may be based on the respective calculated average differentials.

As one example, the analysis module 210 may determine that the average indoor differential during the wintertime is 2° F. when the target indoor temperature is set to 72° F. Thus, the analysis module 210 may be configured to identify when a differential between a current target temperature and a current indoor temperature exceeds 2° F. Accordingly, the analysis module 210 may be configured to identify when a current indoor differential between a current target temperature and a current indoor temperature exceeds 2° F. when the current target temperature is set to 72° F. during the winter. As another example, the analysis module 210 may determine that the average outdoor differential during the wintertime is 15° F. when the target indoor temperature is set to 72° F. Accordingly, the analysis module 210 may identify when a current outdoor differential exceeds 15° F. when the current target temperature is set to 72° F. during the winter. Thus, temperature preference module 145-a may be configured to continually refine the calculation of suggested target temperatures by generating a learning pattern based on environmental conditions. Temperature preference module 145-a may learn user preferences based on user behavior relative to suggested target temperatures. Accordingly, the temperature preference module 145-a may learn temperature preferences by tracking thermostat settings and associated indoor and outdoor conditions, and tracking what the occupant does when a suggested target temperature is displayed (e.g., whether the occupant accepts the suggested target temperature, adjusts the suggested target temperature, etc.).

Figure 3:
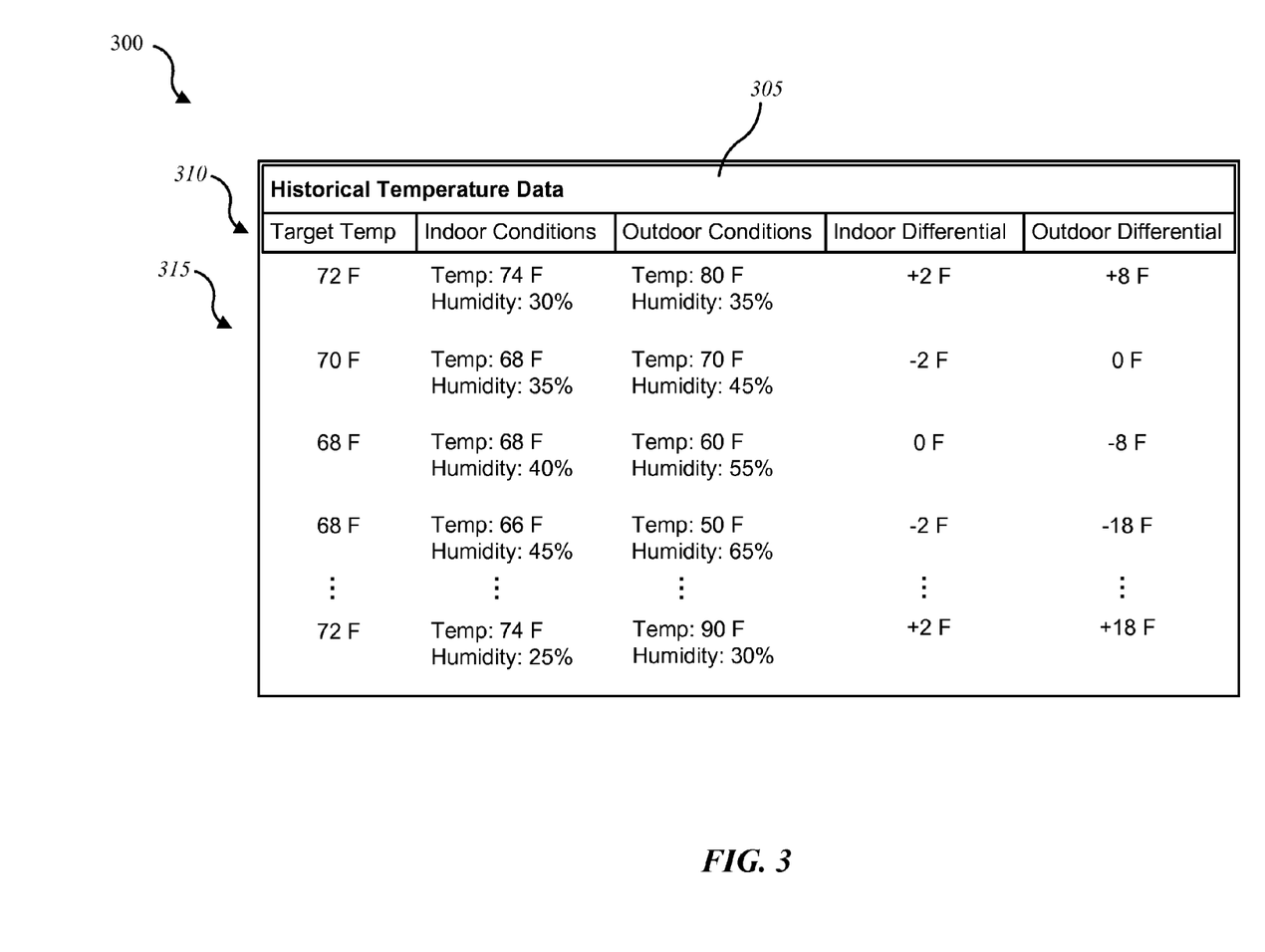
FIG. 3 is a block diagram illustrating one example of an environment for relative temperature preference learning.

FIG. 3 is a block diagram illustrating one example of database entries 300 for relative temperature preference learning. As depicted, the database entries 300 may include a title section 305, a subtitle section 310, and a data section 315. For example, as illustrated, the database entries 300 may include a title section 305 of "Historical Temperature Data," indicating that the stored data relates to gathered temperature-related data (e.g., monitored indoor/outdoor conditions, etc.). In some embodiments, the entries 300 may be one example of the historical temperature data 160 of FIG. 1. The entries 300 may include subtitles such as "Target Temp," "Indoor Conditions," "Outdoor Conditions," "Indoor Differential," and "Outdoor Differential," indicating the type of data stored. The data section 315 may include the recorded data. Thus, the data section 315 may include one or more recorded target temperatures under the "Target Temp" subtitle, for example. The data under "Target Temp" may indicate target temperatures of a premises recorded at various times. For example, when a user adjusts the target temperature of a thermostat, this adjustment may trigger temperature preference module 145 to record the new target temperature as an entry. In some embodiments, the most recently recorded entry may be treated as current conditions of the premises. As depicted, the most recent entry may be the top-most entry. Thus, the current conditions of the premises may be 74° F. indoors with 30% humidity, 80° F. outdoors with 35% humidity, and the current target temperature is 72° F. As illustrated, each entry may include an indoor and outdoor differential. The indoor differential may indicate the difference between the target temperature at a given time and the indoor temperature at that time. Likewise, the outdoor differential may indicate the difference between the target temperature at a given time and the outdoor temperature at that time. Accordingly, the top entry indicates that the thermostat of the premises is set at 72° F. while the indoor temperature is 74° F. With the indoor temperature 2° F. higher than the target temperature, the indoor differential would be +2° F., as illustrated, and with the outdoor temperature 8° F. higher than the target temperature, the outdoor differential would be +8° F., as illustrated.

In some cases, temperature preference module 145 may calculate an average indoor differential and/or average outdoor differential from the entries 300. One or more thresholds may be configured based on the calculated average indoor and/or outdoor differentials. In some embodiments, temperature preference module 145 may calculate a suggested target temperature based on the current indoor/outdoor conditions and based on the data recorded in entries 300. Accordingly, temperature preference module 145 may query entries 300 for previously recorded data in order to analyze current indoor/outdoor conditions in relation to a target temperature setting and calculate a suggested target temperature.

Figure 4:
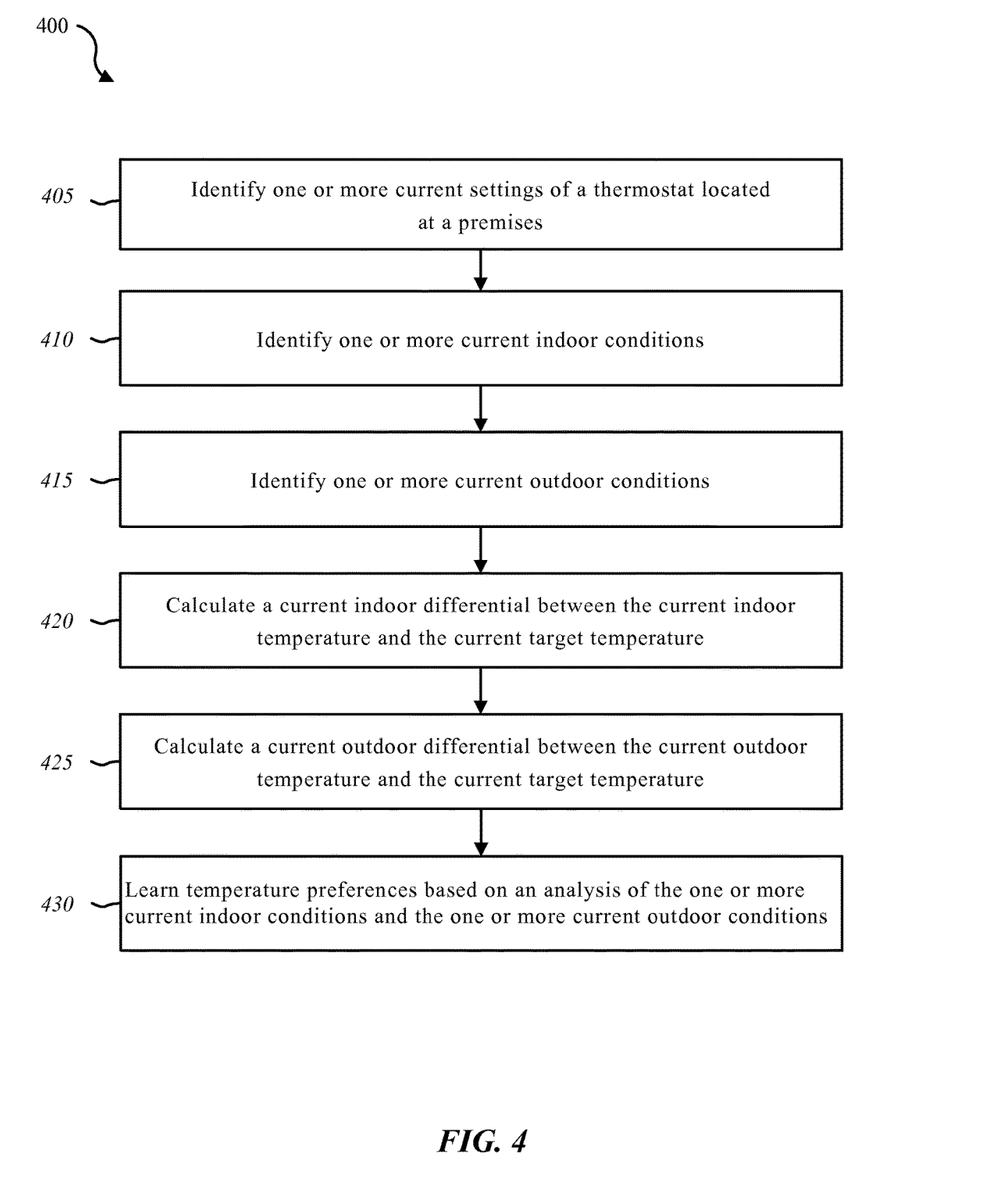
FIG. 4 is a flow diagram illustrating one embodiment of a method for relative temperature preference learning.

FIG. 4 is a flow diagram illustrating one embodiment of a method 400 for relative temperature preference learning. In some configurations, the method 400 may be implemented by the temperature preference module 145 illustrated in FIGS. 1 and/or 2. In some configurations, the method 400 may be implemented in conjunction with the application 140 and/or the user interface 135 illustrated in FIG. 1.

At block 405, one or more current settings of a thermostat located at a premises may be identified. The one or more current settings of the thermostat may include at least one of a current target temperature, current runtime settings, and/or current airflow settings. At block 410, one or more current indoor conditions may be identified. The one or more current indoor conditions may include at least one of a current indoor temperature, a current indoor humidity, and a current indoor airflow. At block 415, one or more current outdoor conditions may be identified. The one or more current outdoor conditions may include at least one of a current outdoor temperature, a current outdoor humidity, a current atmospheric pressure, a current level of precipitation, and/or a current level of cloud cover. At block 420, a current indoor differential between the current indoor temperature and the current target temperature may be calculated. At block 425, a current outdoor differential between the current outdoor temperature and the current target temperature may be calculated. At block 430, temperature preferences may be learned based on an analysis of the one or more current indoor conditions and the one or more current outdoor conditions.

Figure 5:
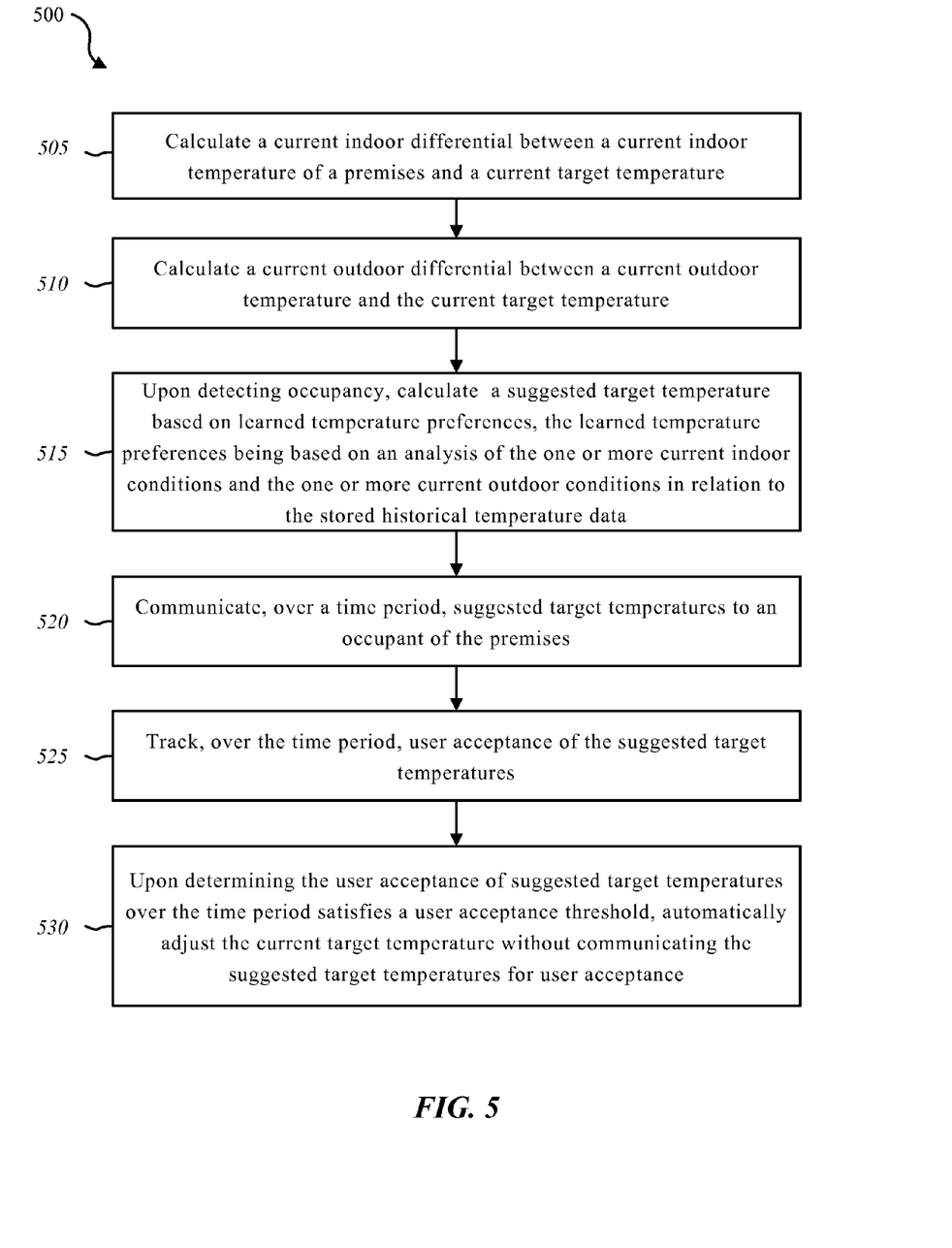
FIG. 5 is a flow diagram illustrating one embodiment of a method for relative temperature preference learning.

FIG. 5 is a flow diagram illustrating one embodiment of a method 500 for relative temperature preference learning. In some configurations, the method 500 may be implemented by the temperature preference module 145 illustrated in FIG. 1 or 2. In some configurations, the method 500 may be implemented in conjunction with the application 140 and/or the user interface 135 illustrated in FIG. 1.

Figure 6:
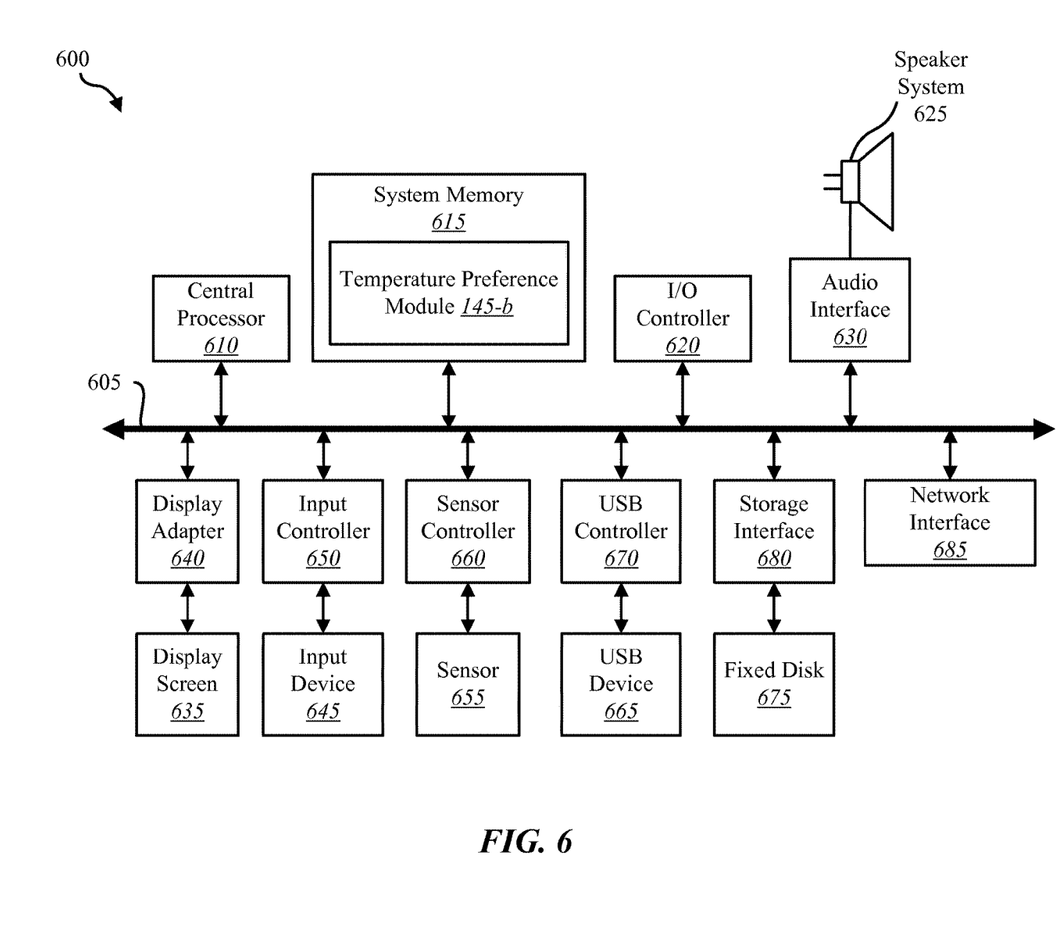
FIG. 6 depicts a block diagram of a computer system suitable for implementing the present systems and methods.

At block 505, a current indoor differential between a current indoor temperature and a current target temperature may be calculated. At block 510, a current outdoor differential between a current outdoor temperature and the current target temperature may be calculated. At block 515, upon detecting occupancy, a suggested target temperature may be calculated based on learned temperature preferences, the learned temperature preferences being based on an analysis of the one or more current indoor conditions and the one or more current outdoor conditions in relation to the stored historical temperature data. In some cases, the suggested target temperature may be calculated based on determining whether the current indoor differential satisfies an indoor differential threshold and/or based determining whether the current outdoor differential satisfies an outdoor differential threshold. In some cases, the suggested target temperature may be calculated based on an adjustment of a setting of a thermostat. The setting of the thermostat may be set manually at the premises or remotely via, for example, a smartphone. At block 520, suggested target temperatures may be communicated over a time period to an occupant of the premises. At block 525, user acceptance of the suggested target temperatures may be tracked over the time period. At block 530, upon determining the user acceptance of suggested target temperatures over the time period satisfies a user acceptance threshold, the current target temperature may be automatically adjusted without communicating the suggested target temperatures for user acceptance FIG. 6 depicts a block diagram of a computing device 600 suitable for implementing the present systems and methods. The device 600 may be an example of device 105, computing device 150, automation controller 155 and/or server 110 illustrated in FIG. 1. In one configuration, device 600 includes a bus 605 which interconnects major subsystems of device 600, such as a central processor 610, a system memory 615 (typically RAM, but which may also include ROM, flash RAM, or the like), an input/output controller 620, an external audio device, such as a speaker system 625 via an audio output interface 630, an external device, such as a display screen 635 via display adapter 640, an input device 645 (e.g., remote control device interfaced with an input controller 650), multiple USB devices 665 (interfaced with a USB controller 670), and a storage interface 680. Also included are at least one sensor 655 connected to bus 605 through a sensor controller 660 and a network interface 685 (coupled directly to bus 605).

Bus 605 allows data communication between central processor 610 and system memory 615, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the temperature preference module 145-b to implement the present systems and methods may be stored within the system memory 615. Applications (e.g., application 140) resident with device 600 are generally stored on and accessed via a non-transitory computer readable medium, such as a hard disk drive (e.g., fixed disk 675) or other storage medium. Additionally, applications can be in the form of electronic signals modulated in accordance with the application and data communication technology when accessed via interface 685.

Storage interface 680, as with the other storage interfaces of device 600, can connect to a standard computer readable medium for storage and/or retrieval of information, such as a fixed disk drive 675. Fixed disk drive 675 may be a part of device 600 or may be separate and accessed through other interface systems. Network interface 685 may provide a direct connection to a remote server via a direct network link to the Internet via a POP (point of presence). Network interface 685 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to device 600 wirelessly via network interface 685.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 6 need not be present to practice the present systems and methods. The devices and subsystems can be interconnected in different ways from that shown in FIG. 6. The aspect of some operations of a system such as that shown in FIG. 6 are readily known in the art and are not discussed in detail in this application. Code to implement the present disclosure can be stored in a non-transitory computer-readable medium such as one or more of system memory 615 or fixed disk 675. The operating system provided on device 600 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above-described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A method for relative temperature preference learning, comprising:
   identifying one or more current settings of a thermostat, wherein the thermostat is a component of a heating ventilation air conditioning (HVAC) system located at a premises, wherein the one or more current settings of the thermostat include at least one of a current target temperature, current runtime settings, and current airflow settings of the HVAC system;
   identifying one or more current indoor conditions, wherein the one or more current indoor conditions include at least one of a current indoor temperature, current indoor humidity, and current indoor airflow;
identifying one or more current outdoor conditions, wherein the one or more current outdoor conditions include at least one of a current outdoor temperature, a current outdoor humidity, current atmospheric pressure, current level of precipitation, and current level of cloud cover;
calculating a current indoor differential between the current indoor temperature and the current target temperature;
calculating a current outdoor differential between the current outdoor temperature and the current target temperature;
identifying historical temperature data stored in a database, the historical temperature data comprising a plurality of historical target temperatures, wherein each record of the plurality of historical target temperatures is associated with an historical indoor temperature and an historical outdoor temperature;
calculating an average indoor differential, based at least in part on a set of calculated differentials between the identified historical target temperatures and associated historical indoor temperatures;
calculating an average outdoor differential, based at least in part on a set of calculated differentials between the identified historical target temperatures and associated historical outdoor temperatures;
communicating, over a time period, suggested target temperatures to an occupant of the premises;
tracking, over the time period, user acceptance of the suggested target temperatures;
learning temperature preferences for the target temperature based on an analysis of the one or more current indoor conditions, the one or more current outdoor conditions, the calculated current outdoor differential, the calculated indoor differential, the calculated average outdoor differential, the calculated average indoor differential, the tracked user acceptance, and the stored historical temperature data; and
adjusting, by a temperature preference module, the current target temperature of the HVAC system based at least in part on the learned temperature preferences for the target temperature.

2. The method of claim 1, comprising:
upon determining the user acceptance of the suggested target temperatures over the time period satisfies a user acceptance threshold, automatically adjusting the current target temperature without communicating the suggested target temperatures for user acceptance.

3. The method of claim 1, comprising:
determining whether the current indoor differential satisfies an indoor differential threshold, the indoor differential threshold being based on the calculated average indoor differential.

4. The method of claim 3, comprising:
upon determining the current indoor differential satisfies the indoor differential threshold and the premises is occupied, calculating a suggested target temperature based on the learned temperature preferences, the learned temperature preferences being based on the analysis of the one or more current indoor conditions and the one or more current outdoor conditions in relation to the stored historical temperature data.

5. The method of claim 1, comprising:
determining whether the current outdoor differential satisfies an outdoor differential threshold, the outdoor differential threshold being based on the calculated average outdoor differential.

6. The method of claim 5, comprising:
upon determining the current outdoor differential satisfies the outdoor differential threshold and the premises is occupied, calculating a suggested target temperature based on the learned temperature preferences, the learned temperature preferences being based on the analysis of the one or more current indoor conditions and the one or more current outdoor conditions in relation to the stored historical temperature data.

7. A computing device configured for relative temperature preference learning, comprising:
a processor;
memory in electronic communication with the processor, wherein the memory stores computer executable instructions that when executed by the processor cause the processor to perform the steps of:
identifying one or more current settings of a thermostat, wherein the thermostat is a component of a heating ventilation air conditioning (HVAC) system located at a premises, wherein the one or more current settings of the thermostat include at least one of a current target temperature, current runtime settings, and current airflow settings of the HVAC system;
identifying one or more current indoor conditions, wherein the one or more current indoor conditions include at least one of a current indoor temperature, current indoor humidity, and current indoor airflow;
identifying one or more current outdoor conditions, wherein the one or more current outdoor conditions include at least one of a current outdoor temperature, a current outdoor humidity, current atmospheric pressure, current level of precipitation, and current level of cloud cover;
calculating a current indoor differential between the current indoor temperature and the current target temperature;
calculating a current outdoor differential between the current outdoor temperature and the current target temperature;
identifying historical temperature data stored in a database, the historical temperature data comprising a plurality of historical target temperatures, wherein each record of the plurality of historical target temperatures is associated with an historical indoor temperature and an historical outdoor temperature;
calculating an average indoor differential, based at least in part on a set of calculated differentials between the identified historical target temperatures and associated historical indoor temperatures;
calculating an average outdoor differential, based at least in part on a set of calculated differentials between the identified historical target temperatures and associated historical outdoor temperature;
communicating, over a time period, suggested target temperatures to an occupant of the premises;
tracking, over the time period, user acceptance of the suggested target temperatures
learning temperature preferences for the target temperature based on an analysis of the one or more current indoor conditions, the one or more current outdoor conditions, the calculated current outdoor differential, the calculated indoor differential, the calculated average outdoor differential, the calculated average indoor differential, the tracked user acceptance, and the stored historical temperature data; and adjusting, by a temperature preference module, the current target temperature of the HVAC system based at least in part on the learned temperature preferences for the target temperature.

8. The computing device of claim 7, wherein the instructions executed by the processor cause the processor to perform the steps of:
    upon determining the user acceptance of the suggested target temperatures over the time period satisfies a user acceptance threshold, automatically adjusting the current target temperature without communicating the suggested target temperatures for user acceptance.

9. The computing device of claim 7, wherein the instructions executed by the processor cause the processor to perform the steps of:
    determining whether the current indoor differential satisfies an indoor differential threshold, the indoor differential threshold being based on the calculated average indoor differential.

10. The computing device of claim 9, wherein the instructions executed by the processor cause the processor to perform the steps of:
    upon determining the current indoor differential satisfies the indoor differential threshold and the premises is occupied, calculating a suggested target temperature based on the learned temperature preferences, the learned temperature preferences being based on the analysis of the one or more current indoor conditions and the one or more current outdoor conditions in relation to the stored historical temperature data.

11. The computing device of claim 7, wherein the instructions executed by the processor cause the processor to perform the steps of:
    determining whether the current outdoor differential satisfies an outdoor differential threshold, the outdoor differential threshold being based on the calculated average outdoor differential; and
    upon determining the current outdoor differential satisfies the outdoor differential threshold and the premises is occupied, calculating a suggested target temperature based on the learned temperature preferences, the learned temperature preferences being based on the analysis of the one or more current indoor conditions and the one or more current outdoor conditions in relation to the stored historical temperature data.

12. A non-transitory computer-readable storage medium storing computer executable instructions that when executed by a processor cause the processor to perform the steps of:
    identifying one or more current settings of a thermostat, wherein the thermostat is a component of a heating ventilation air conditioning (HVAC) system located at a premises, wherein the one or more current settings of the thermostat include at least one of a current target temperature, current runtime settings, and current airflow settings of the HVAC system;
    identifying one or more current indoor conditions, wherein the one or more current indoor conditions include at least one of a current indoor temperature, current indoor humidity, and current indoor airflow;
    identifying one or more current outdoor conditions, wherein the one or more current outdoor conditions include at least one of a current outdoor temperature, a current outdoor humidity, current atmospheric pressure, current level of precipitation, and current level of cloud cover;
    calculating a current indoor differential between the current indoor temperature and the current target temperature;
    calculating a current outdoor differential between the current outdoor temperature and the current target temperature; and
    identifying historical temperature data stored in a database, the historical temperature data comprising a plurality of historical target temperatures, wherein each record of the plurality of historical target temperatures is associated with an historical indoor temperature and an historical outdoor temperature;
    calculating an average indoor differential, based at least in part on a set of calculated differentials between the identified historical target temperatures and associated historical indoor temperatures;
    calculating an average outdoor differential, based at least in part on a set of calculated differentials between the identified historical target temperatures and associated historical outdoor temperature;
    communicating, over a time period, suggested target temperatures to an occupant of the premises;
    tracking, over the time period, user acceptance of the suggested target temperatures;
    learning temperature preferences for the target temperature based on an analysis of the one or more current indoor conditions, the one or more current outdoor conditions, the calculated current outdoor differential, the calculated indoor differential, the calculated average outdoor differential, the calculated average indoor differential, the tracked user acceptance, and the stored historical temperature data; and
    adjusting, by a temperature preference module, the current target temperature of the HVAC system based at least in part on the learned temperature preferences for the target temperature.

* * * * *